United States Patent Office 3,428,371
Patented Feb. 18, 1969

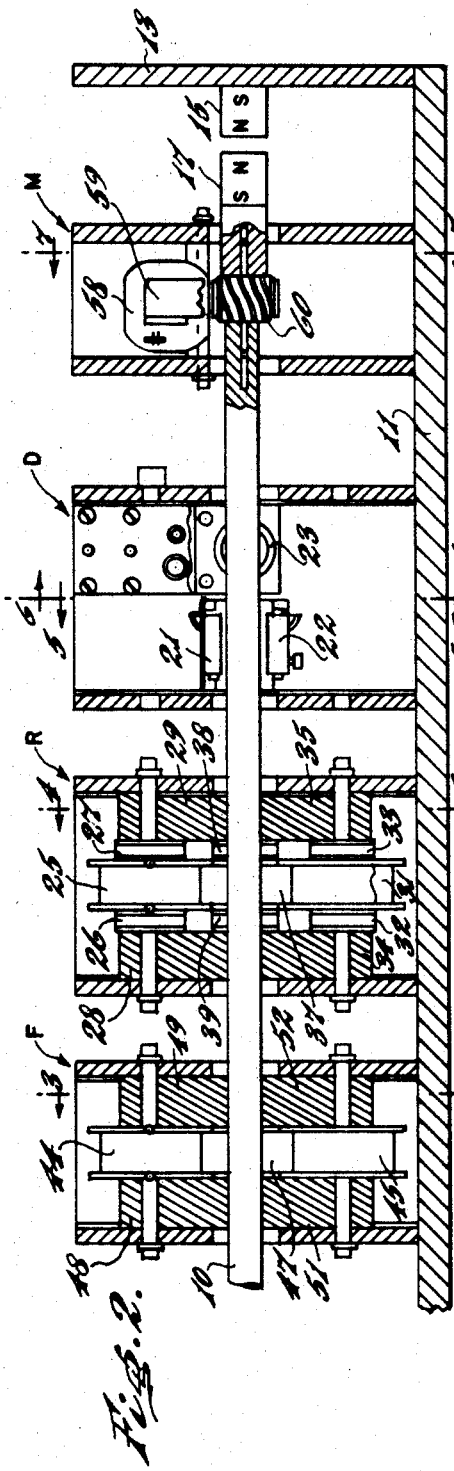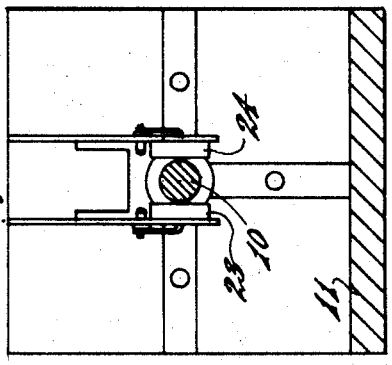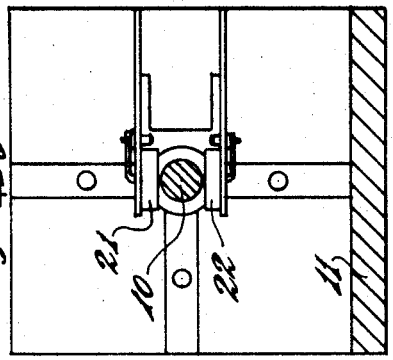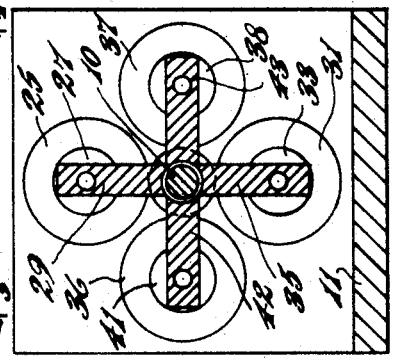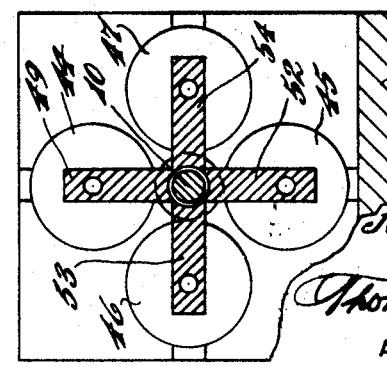

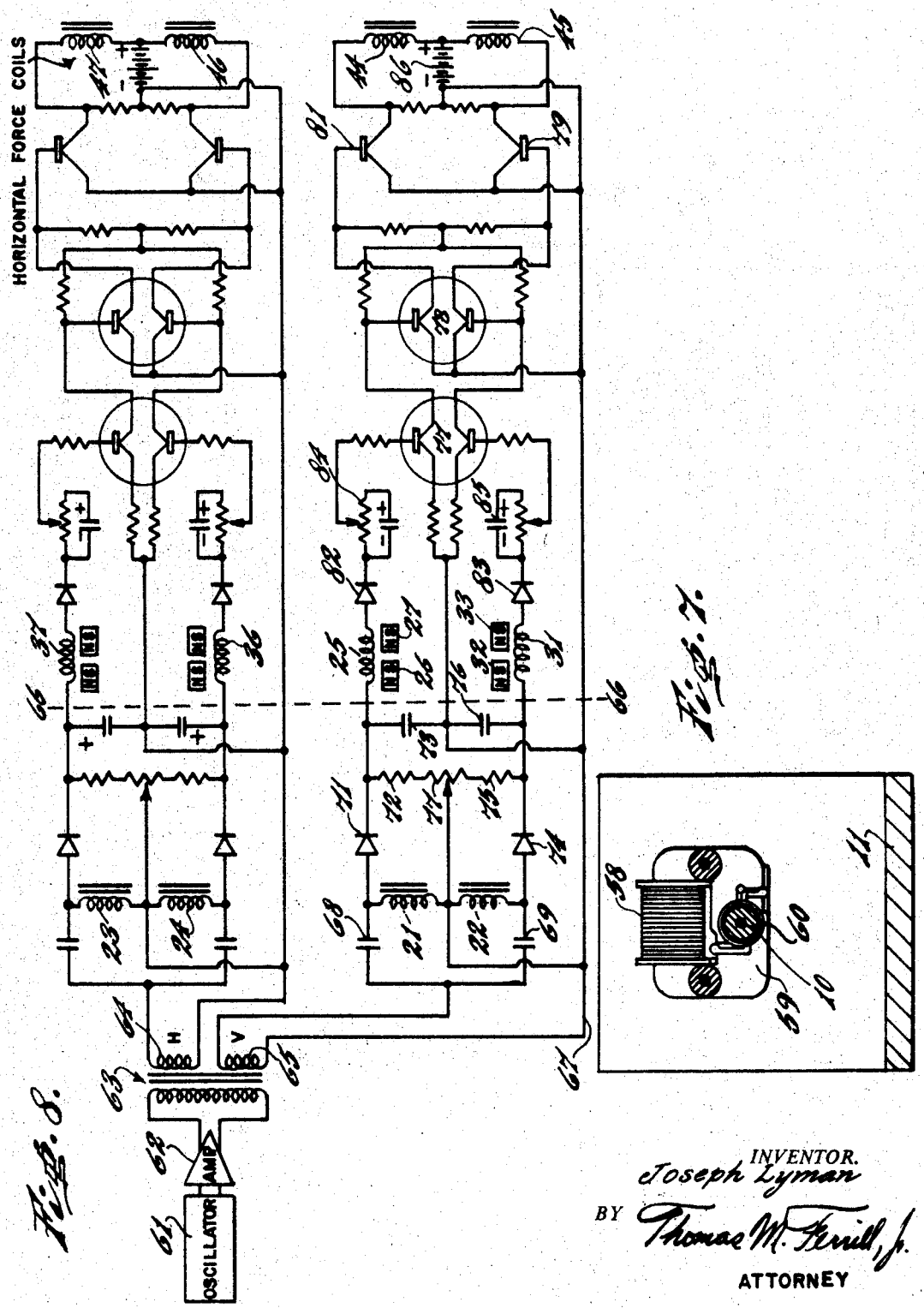

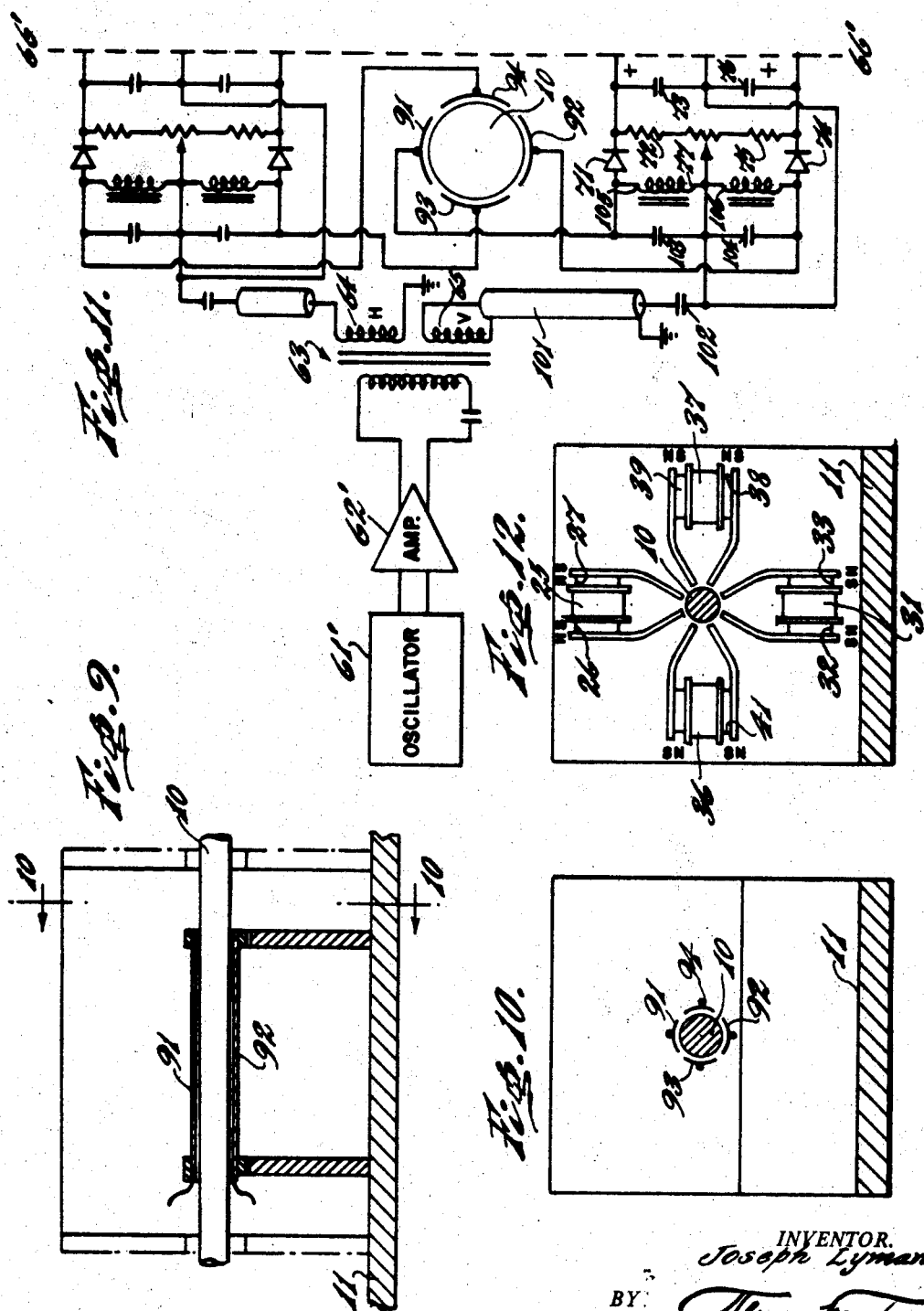

3,428,371
SUSPENSION APPARATUS
Joseph Lyman, Northport, N.Y., assignor to Cambridge Thermionic Corporation, Cambridge, Mass., a corporation of Massachusetts
Filed Jan. 24, 1966, Ser. No. 522,726
U.S. Cl. 308—10                9 Claims
Int. Cl. F16c 39/06, 35/00

The present invention relates to suspension systems, and is particularly concerned with suspension apparatus wherein substantial centering forces are achieved with stability and with economy of supplied power.

In certain types of magnetic suspension systems heretofore provided, a movable body such as a rotatable shaft is supported and held in position by magnetic forces. In one such arrangement, illustrated in U.S. patent application Ser. No. 211,541, filed July 20, 1962, by Joseph Lyman and entitled Magnetic Suspension, a rotatable shaft is aligned substantially along a predetermined axis and held in place, as to at least certain of its degrees of freedom, by the magnetic forces exerted by opposed pairs of electromagnets energized by alternating current supply means. Each of the electromagnets is an inductance portion of a tuned circuit, the tuning of which is offset a predetermined amount from resonance with the alternating current supply means. As the movable body, sometimes referred to as a controlled member, moves toward one electromagnet and away from another, the resultant changes of resonant frequencies of the respective tuned circuits cause differential changes of the electromagnet alternating currents and the resultant forces, tending to re-position the movable body in its predetermined position. The forces which such a structure can exert are limited, since considerable electric power must be applied to the electromagnets if substantial forces are required. Because of the inefficiency of alternating-current actuated electromagnets as force exerting means, only moderate forces can be generated by such means without overheating.

In magnetic suspension systems in accordance with the prior art, the primary control factor (and in many cases the sole control factor) of the force exerting means is the displacement of the controlled member from a predetermined position. In those cases in which a rate-of-motion factor is used, it is introduced merely as a supplement or refinement superimposed on the displacement-responsive main signal. This is in some instances provided by an electrical differentiating circuit such as one including reactance and resistance components connected to the displacement signal circuit. I have found that this is not the best way to provide for positional control in a magnetic suspension system; on the contrary, the velocity-responsive signals should predominate as the principal control components, and the displacement signals should be subordinated thereto.

An object of the present invention is to provide improved suspension apparatus.

A further object is to provide suspension apparatus wherein large forces are controllably exerted by electromagnets in such a way as to achieve economy in the power requirements and compactness of the force exerting units.

A further object is to provide suspension apparatus wherein the forces exerted by electromagnetic position controlling means are flexibly controllable according to a desired proportioning of the velocity and displacement components of movement of the controlled member.

Yet a further object of the invention is to achieve magnetic suspension apparatus of high stability and capable of exerting great forces on the controlled member in relation to the power required.

In accordance with the present invention, a magnetic-suspension system is provided in which the forces transverse to the controlled member are exerted by electromagnets energized by unidirectional electric currents. Transverse velocity-responsive means are provided for exerting control of the electromagnet energizing current primarily in accordance with the rate of transverse movement of the controlled member, so that the field strength of an electromagnet field unit is decreased appreciably as the controlled member moves toward it and increased appreciably as the controlled member moves away from it, the magnitude of the change of field strength being dependent primarily on the velocity of the controlled member. Superimposed on this control effect, and subordinated thereto, is a displacement-responsive arrangement for so changing the magnetic field strength acting on the controlled member with changes of position thereof as to urge the controlled member substantially into its predetermined position at extremely low velocity. The velocity-responsive means exerts great forces in opposition to transverse movement of the controlled member at a moderate velocity, with the result that the controlled member stiffly resists forces tending to move it transversely. This is true, whether the member is in its desired position (for example, aligned with a predetermined central longitudinal axis), or is transversely displaced from said position. The displacement-responsive arrangement modifies or supplements the action of the velocity-responsive means, providing assurance that after any positional departure, the controlled member eventually will be returned substantially to its predetermined position. By the use of rate-responsive signal generating means and separate displacement-responsive signal generating means, the present invention permits these signal components to be generated substantially independently of each other and facilitates the apportionment of the control effect between their contributions for the desired predominance of the velocity-responsive component.

Illustrative embodiments of the infention are described hereinafter and are shown in the accompanying drawings, wherein:

FIG. 2 is a sectional view of the right-hand half of a symmetrical magnetic bearing system of the type represented in FIG. 1;

FIG. 3 is a cross-sectional view taken on line 3—3 in FIG. 2, showing the arrangement of the transverse force-applying electromagnets for the right-hand end of the system;

FIG. 4 is a cross-sectional view taken on line 4—4 in FIG. 2, showing the arrangement of the right-hand transverse velocity-responsive sensing unit;

Figure 1:
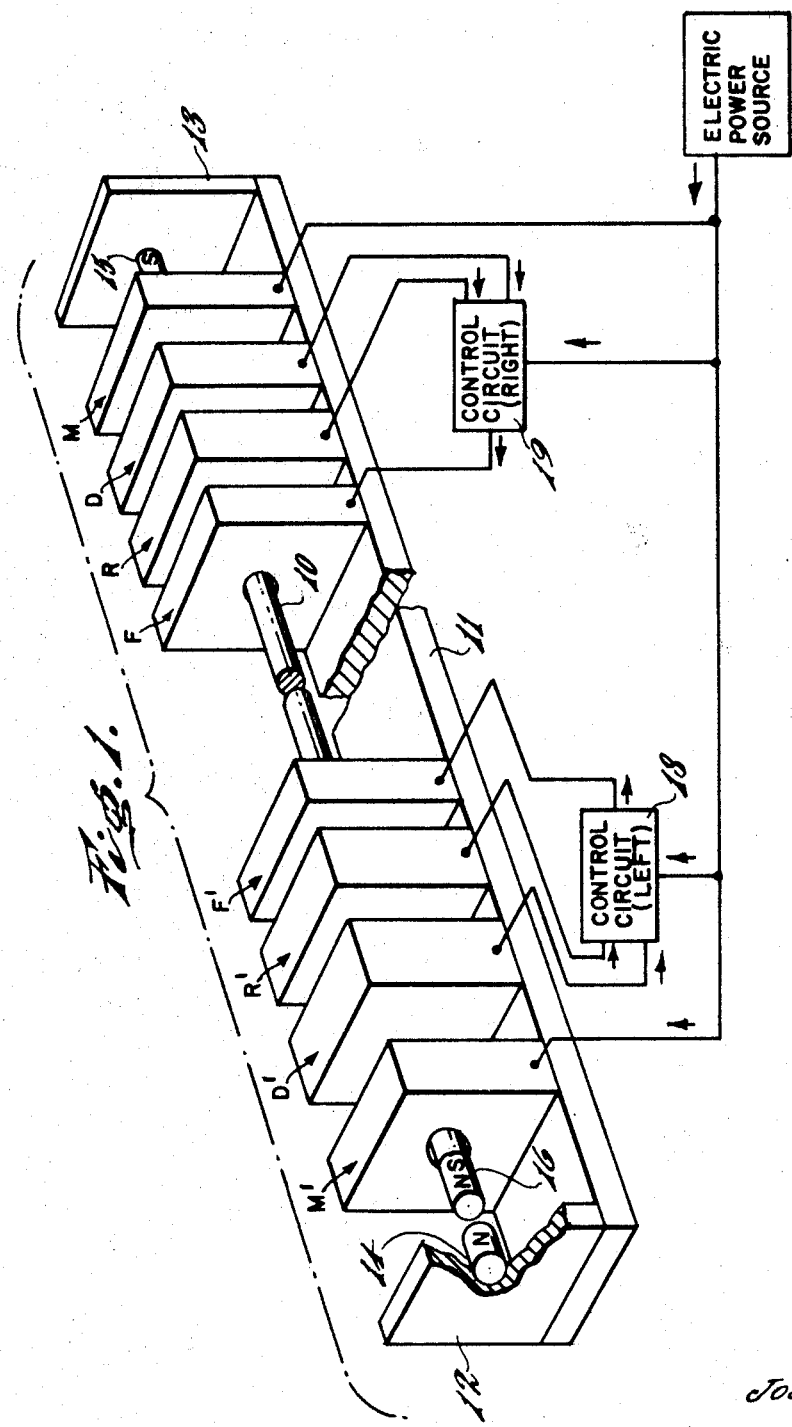
FIG. 1 is a perspective representation of an embodiment of the invention, wherein the force appliers, displacement units, rate sensing units, and torque motor units are represented as blocks.

FIGS. 5 and 6 are cross-sectional views taken on the lines 5—5 and 6—6 in FIG. 2, showing the arrangement of the right-hand magnetic displacement sensing unit, FIG. 5 showing the portion thereof responsive to the vertical displacement component and FIG. 6 showing the portion thereof responsive to the horizontal displacement component;

FIG. 7 is a cross-sectional view taken on the line 7—7 in FIG. 2, showing a motor unit for imparting torque to the shaft;

FIG. 8 is a circuit diagram of electric circuits for control of the position of the right-hand part of the shaft;

FIG. 9 is a partial longitudinal view of an alternative unit for sensing transverse displacement of one end of the shaft;

FIG. 10 is a cross-sectional view of the alternative displacement sensing unit, taken on line 10—10 in FIG. 9;

FIG. 11 is a partial circuit diagram illustrating the changes made in the circuit of FIG. 8 to accommodate the alternative displacement sensing unit of FIGS. 9 and 10; and FIG. 12 is a transverse view of an alternative configuration of the right-hand velocity-responsive sensing unit.

Throughout the figures, similar reference numerals are relied upon to represent corresponding parts.

Referring now to FIG. 1, a preferred embodiment of the invention is shown in perspective. A shaft 10 is arranged to be magnetically supported along a predetermined axis parallel to base 11. On the base 11 are provided end members 12 and 13 which rigidly support bar magnets 14 and 15. Further permanent magnets, illustrated as short cylindrical bar magnets, are provided on the ends of shaft 10, and are polarized to be repelled by the fixed magnets in end members 12 and 13. The magnet fixed to the left end of shaft 10 is shown at 16. The magnet 17 fixed to the right end of shaft 10 is visible in FIG. 2 but not in the perspective view.

In accordance with the present invention, apparatus is provided on base 11 for retaining shaft 10 substantially aligned with a predetermined axis which preferably is parallel to and at a fixed height above base 11. For this purpose, two force-applying units F and F' are provided on base 11, and are preferably spaced a substantial distance on opposite sides of the middle of shaft 10. Means 18 and 19 are provided for supplying electric power to the force applying units F and F', and for varying the supplied power in accordance with the displacement and rate of motion of said shaft 10 relative to the predetermined axis. Displacement pick-offs D and D' are provided for the right and left ends of shaft 10, and rate-of-movement responsive pick-offs R and R' are similarly provided. The amplified signals from pick-offs D and R control the power applied to force unit F, and the amplified signals from pick-offs D' and R' control the power applied to force unit F'.

Also illustrated in FIG. 1 are two motor units M and M'. These may be arranged to oppose each other, as in a differential force integrating device, or to cooperate in providing rotation of the shaft 10 according to the sum of the contributions of the two units. For some purposes, only a single motor unit M may be used, positioned as shown or alternatively positioned nearer the middle of shaft 10. One or both of the units schematically represented as motors M and M' may be a fluid motor, as for example an air motor, or may be a radiation vane or means responsive to other phenomena. In yet other applications of the bearing system, no motor unit such as M or M' may be required.

FIG. 7 illustrates a shaded-pole motor drive arrangement, which is also seen to the right in FIG. 2. This is one of several possible drive arrangements. It comprises a stator 58, a shaded-pole core 59, and an armature 60 on the shaft 10. This is only one of various possible arrangements of motor construction for imparting angular movement to the shaft 10.

Referring now to FIG. 2, and to FIGS. 3 to 5, inclusive, which are sectional views taken on lines 3—3, 4—4 and 5—5 in FIG. 2, each of the units D, R and F comprises a pair of coils coacting with shaft 10 with respect to its vertical component of movement, and a further pair of coils coacting with shaft 10 with respect to its horizontal component of movement, i.e., its component parallel to base 11. In unit D, coils 21 and 22 (FIGS. 2 and 5) are so arranged above and below the shaft 10 that these coils have equal inductance values only when the axis of the shaft is midway between these coils, i.e., when it forms equal gaps with their cores. An upward displacement of the right-hand portion of shaft 10 from its mid-position causes an increase of the inductance of coil 21 and a decrease of the inductance of coil 22, and a displacement in the opposite direction produces the converse effects. Two further coils 23 and 24 (FIGS 2 and 6) are similarly arranged to provide equal inductances only when the right-hand end of shaft 10 is midway between, and to sense the displacement from this position in the same way that coils 21 and 22 sense the vertical displacements.

For the generation of rate-of-motion responsive signals, unit R (FIGS. 2 and 4) relies upon changes in magnetic flux through vertical and horizontal rate component pickup coils, each of which is provided with permanent magnet means to establish the flux. Upper coil 25 wound on a permeable core cooperates with button magnets 26 and 27 and pole pieces 28 and 29 to provide a magnetic flux loop therethrough, the loop extending through the portion of shaft 10 which is within unit R', and through the gaps between said shaft and the adjacent pole faces of pole pieces 28 and 29. Similarly, coil 31 and its associated magnets 32 and 33 and pole pieces 34 and 35 establish a magnetic circuit including the portion of shaft 10 within unit R'. In the absence of movement of shaft 10 nearer to the upper or the lower of the pole pieces, no voltage is generated by coils 25 and 31. Upon upward movement of the shaft, the increasing flux through coil 25 and decreasing flux through coil 31 produce oppositely polarized voltages of magnitude proportional to the rate of change of flux, and hence approximately proportional to the vertical component of velocity of the movement.

Coils 36 and 37 are provided for the generation of signals representing the horizontal velocity component of transverse motion of the shaft 10. Each of these coils is provided with a pair of pole pieces and permanent magnets in the same way as the vertical-component rate coils 25 and 31. The magnets 38 and 39 associated with coil 37 are visible in FIG. 2. Magnet 38 as well as one magnet 41 associated with coil 36 can be seen in FIG. 4. In the latter view, pole pieces 42 and 43 associated with coils 36 and 37 are also shown, in section. Coils 36 and 37 and their associated magnets and pole pieces serve as rate signal generators with respect to the horizontal component of transverse movement of shaft 10 in the same manner as coils 25 and 31 and their associated magnets and pole pieces serve as rate signal generators with respect to the vertical component of movement of the shaft 10.

As will be appreciated, the magnetic flux generated by the pair of magnets associated with each velocity-responsive signal coil exerts small attractive forces on the shaft 10—forces which are balanced when the shaft is centered. When the shaft departs from its predetermined axial position, the forces exerted by the velocity signal generator magnets become unbalanced in the direction of instability, i.e., the rate-responsive unit approached by the shaft exerts an increased attractive force, tending to move the shaft even further from its predetermined axial position. However, the forces exerted directly on the shaft by the transverse velocity rate signal devices are so small compared to the forces exerted by the principal force units as to be negligible.

The right-hand unit for exerting transverse forces on the shaft 10 comprises coils 44 and 45 for exerting opposed forces upward and downward, respectively, and coils 46 and 47 for exerting opposed horizontal forces on the shaft 10. Each of these coils is provided with a permeable core and a pair of pole peices extending to the proximity of shaft 10. The pole pieces 48 and 49 for coil 44 and the pole pieces 51 and 52 for coil 45 are visible in FIG. 2. In addition, pole pieces 53 and 54 associated with coils 46 and 47 can be seen in FIG. 3, along with aforementioned pole pieces 49 and 52.

An illustrative version of one of the two identical circuit arrangements 18 and 19 for the apparatus of FIGS. 1 to 6 inclusive is set forth in FIG. 8. An oscillator 61 and amplifier 62 are provided for supplying voltage of a predetermined frequency to the primary winding of transformer 63. This transformer has one secondary winding 64 connected to the horizontal displacement-responsive circuit and a secondary winding 65 connected to the vertical displacement-responsive circuit. Since the horizontal displacement-responsive circuit and rate-responsive circuit, the associated amplifying system, and the horizontal force coils are duplicates of the respective portions of the vertical circuit system, only the latter will now be described in detail.

The output voltage produced by secondary winding 65 is supplied between a common conductor 67 and the left-hand terminals of a pair of capacitors 68 and 69. The right-hand terminals of capacitors 68 and 69 are connected respectively to end terminals of coils 21 and 22, the opposite end terminals of which are connected together and to the common conductor 67. Capacitor 68 and coil 21 are tuned to series-resonance for a frequency substantially different from the frequency of oscillator 61, e.g., a frequency somewhat lower than the oscillator frequency. Accordingly, a substantial alternating voltage is produced across inductor 21 and a substantially equal alternating voltage is produced across inductor 22 of the similarly tuned series L–C circuit comprising coil 22 and capacitor 69.

Connected across coil 21 is a rectifier 71 and load circuit including resistor 72 and capacitor 73. Similarly, connected across coil 22 is a rectifier 74 and load circuit including resistor 75 and capacitor 76. A potentiometer resistor 77 is provided between resistors 72 and 75, its adjustable tap being connected to the common conductor 67 and the junction of coils 21 and 22.

As is well known, the alternating voltage produced across the coil 21 in the series tuned circuit 68, 21 will rise as the self-resonant frequency of the series circuit approaches the frequency of the alternating voltage source, and conversely, will decrease as the frequency departs from resonance. Movement of the shaft 10 upward, as seen in FIGS. 2 and 5, results in an increase of inductance of coil 21, decreasing the self-resonant frequency of the circuit 21, 68, accordingly reducing the voltage across coil 21. This in turn reduces the rectified and filtered voltage produced in capacitor 73. Conversely, the upward movement of shaft 10, farther away from coil 22, results in a decrease of inductance of coil 22, causing the tuned circuit 22, 69 to approach resonance with the source system 61,62. Hence, the amplitude of the alternating voltage across coil 22, and consequently, the potential of the unidirectional potential across capacitor 78 is increased. Neglecting any velocity-responsive voltage contribution of the circuit including coils 25 and 31, the greater voltage across capacitor 76, amplified in dual-transistor amplifiers 77 and 78 and transitor 79, produces a more intense current through direct-current electromagnet 45 than that produced through electromagnet 44 as a result of the lesser direct voltage across capacitor 73 being amplified in dual-transistor units 77 and 78 and transitor 81. As a consequence, the electromagnet comprising coil 45 and its associated pole pieces 51 and 52 (FIGS. 2 and 3) exert a greater downward pull on shaft 10 than the upward pull exerted by coil 44 and its associated pole pieces 48 and 49, resulting in the ultimate restoration of shaft 10 to its normal position substantially midway between the upper and left pole pieces.

The voltages produced as a result of the action of the afore-described displacement-responsive circuit elements to the left of broken line 66—66 are superimposed upon a predominant rate-responsive circuit arrangement including coils 25 and 31. These coils cooperate with their permanent magnet 26, 27 and 32, 33 as variable-reluctance motion-responsive signal means. These variable-reluctance voltage generators are so arranged that upward motion of the shaft 10 results in a reduction of the positive potential at the right-hand end of coil 25, and an increased positive voltage at the right-hand end of coil 31. Rectifiers 82 and 83 are so arranged as to prevent any flow of current in the direction opposite to that which results when the right-hand end of coil 25 and the right-hand end of coil 31 respectively, are positive relative to the common conductor 67.

Connected to the input circuits of the transistors in dual transistor unit 77 are adjustable bias circuits 84 and 85, so ararnged as to introduce an adjustable bias in series opposition to the normally positive potentials produced at the cathode output terminals of diodes 82 and 83.

The magnetic field strength in the variable-reluctance rate-signal generators comprising coils 25 and 31, and the windings of these coils, are so proportioned as to have their control contribution normally predominate in influencing the relative strength of the vertical force coils 44 and 45. The direct current power for said vertical force coils 44 and 45 is supplied by source 86, under the amplifying control of transistors 79 and 81. This rate-responsive control resulting from the signal contributions by coils 25 and 31 is so strong that the supply of the alternating voltage from the secondary of transformer 63 can be interrupted without an immediate dropping of the shaft 10. Even without the displacement signal contribution, the application of a transverse disturbing force to the shaft 10 is strongly resisted by the action of the aforementioned rate-responsive circuit. Thus, the impression obtained as to the action on the shaft as a result of the rate-responsive circuit is the same as if it were imbedded in a medium of extremely great viscosity.

As mentioned above, the circuits associated with the right-hand horizontal displacement coils 23 and 24, the right-hand rate-responsive coils 36 and 37, and the right-hand force coils 46 and 47 duplicate the circuits for vertical control, and hence they need not be separately described here in detail.

In a similar manner, for the control of the left-hand part of the shaft 10, the control circuits 18 (FIG. 1) preferably duplicate the control circuits as shown and described in FIG. 8 for the right-hand part of the system.

An alternative arrangement for sensing the transverse displacement of the shaft 10 and for providing displacement-responsive signals in cooperation therewith is illustrated in FIGS. 9, 10 and 11. As shown in FIGS. 9 and 10, instead of relying upon inductance variation in upper and lower coils 21 and 22 and horizontally opposed coils 23 and 24 shown in FIGS. 2, 5 and 6 to sense the transverse displacement of the right-hand portion of the shaft 10, one may rely upon a variable-capacitance pick-off means as illustrated in FIGS. 9, 10 and 11. As shown in FIGS. 9 and 10, the variable-capacitance unit comprises four cylindrical-segment stator plates. These stator capacitor plates 91, 92, 93 and 94 are supported in an insulating support, and arranged to be very closely adjacent to shaft 10, which cooperates as the grounded movable capacitor plate with respect to each of the segmental cylindrical stator plates.

The oscillator 61' and amplifier 62' for the system shown in FIG. 11 are preferably selected for a relatively high frequency, in order to avoid the necessity of having extremely high capacitance in the variable capacitors arranged around and including the surface of the shaft 10.

The output voltage from the vertical system secondary winding 65 is supplied preferably through a coaxial line 101 and a coupling capacitor 102 to the mid-terminal of a pair of capacitors 103 and 104 and a pair of inductors 105 and 106. Capacitor 103, in shunt with the capacitance between upper stator plate 91 and the shaft 10, cooperates with inductor 105 to form a shunt-tuned circuit which is near resonance with the frequency oscillator 61'. Likewise, capacitor 104 in parallel with the capacitance between shaft 10 and stator plate 92 cooperates with inductor 106 to form a shunt-resonant circuit tuned to a frequency normally equal to the normal frequency of the circuits 91, 103, 105.

The remainder of the vertical displacement control circuit, including rectifiers 71 and 74 and R–C circuits 72, 73, 75, 76 and 77 is the same as shown in FIG. 8 and described above.

Upon the shaft 10 becoming displaced upwardly from its normal position, the capacitance across inductor 105 is increased, while the capacitance across inductor 106 is decreased. The circuit 91, 103, 105, already tuned to a frequency somewhat lower than the frequency of oscillator 61', is detuned still farther from resonance, with the consequence that the alternating voltage produced across inductor 105 is reduced, while the voltage across inductor 106 is increased. Accordingly, the voltage across capacitor 73 produced by rectifier 71 is reduced, while the direct voltage produced across capacitor 76 is increased.

The circuits in FIG. 11 are shown only as far as line 66'—66', corresponding to line 66—66 in FIG. 8, since the circuits to the right of this line can be identical to those shown in FIG. 8.

The apparatus herein described is capable of being operated with any desired degree of control by the displacement-responsive means. Even if said means are completely disabled, the velocity responsive means and the amplifying circuits connected thereto control the electromagnetic force-exerting means to provide stable positioning of the shaft. In accordance with the present invention, the displacement signals introduced into the control circuits do not predominate over the transverse velocity responsive signals, but are subordinated thereto so as to provide a supervisory augmentation thereof to restore the desired shaft positioning.

Superior operation of the present invention results from the fact that the force applying electromagnetic means, the displacement responsive means and the velocity responsive means are separate from each other, and the displacement responsive means and the velocity responsive means generate their signals independently of each other. By virtue of the spacing between these units, which may be supplemented by permeable shielding if desired, their magnetic field interactions may be minimized.

In the event that the amplification provided between the velocity-responsive sensing means R and the force-applying means F (FIG. 1) is so great as to cause undesirable regeneration, the velocity-responsive sensing means may be rearranged as shown in FIG. 12. In this arrangement, the velocity pick-up coils have their axes in a plane perpendicular to shaft 10. Since the coils of the force-applying means F are all parallel to the shaft 10, the coupling between these coils and the velocity-responsive coils is minimized.

It will be appreciated that base 11 is merely illustrative of a frame of reference for the magnetic bearing apparatus. The force applying units, velocity (rate)-responsive units and displacement responsive units may be supported on any suitable means, as for example, they may be supported individually on a vehicle which then serves as the frame. Also, in the foregoing description, portions of the above-mentioned units have been referred to as "vertical" and "horizontal." These terms have been applied for convenience to the directions perpendicular and parallel to base 11. Since the apparatus of the present invention is not limited to a base of the form illustrated in the drawings, and since it is not in any event limited to horizontal and vertical orientations of the coil and pole piece portions, these terms have been used as illustrative rather than limiting. It will be apparent, in fact, that the apparatus of the present invention can be installed in spacecraft, for example, where there may be little or no reliance on the vertical and horizontal directions as such.

As will also be apparent, while mutually opposed permanent magnets have been shown as the means for holding the shaft 11 longitudinally in the desired position, other means may be used, such for example as further force-applying electromagnets, which may be provided with longitudinal velocity and displacement-responsive control elements if desired. In this event, permeable discs may be substituted for magnets 16 and 17 on the ends of the shaft 10 to cooperate with the force-applying and sensing means.

Other embodiments and applications of this invention will be obvious to those skilled in the art. However, it is to be specifically understood that all such applications and embodiments are contemplated as coming within the scope of the present invention.

What is claimed is:

1. A magnetic suspension system comprising,
   a movable shaft member to be suspended in a desired stable position along a predetermined axis,
   a frame for said suspension system,
   electromagnetic means on said frame between the middle and each end of said shaft member of exerting mutually opposed forces on said shaft member transverse its axis,
   means between the middle and each end of said shaft and responsive to transverse motion of said shaft for generating electric signals substantially corresponding in polarity and intensity to the direction and speed of transverse movement of said shaft,
   means for amplifying said signals and controlling said electromagnetic means in response to the signals produced by the respective transverse motion responsive means,
   means responsive to displacement of said shaft from said predetermined axis, and means responsive thereto for augmenting the control of said electro-magnetic means to provide force components directed toward aligning said shaft with said axis.

2. A magnetic suspension system as defined in claim 1, wherein said means responsive to displacement of said shaft member from said predetermined axis comprises a set of coils adjacent said shaft member an appreciable distance from the middle thereof and a further set of coils adjacent said shaft member an appreciable distance in the opposite direction from the middle thereof, and means for supplying alternating current to said coils to produce across each coil a voltage varying according to the proximity of said shaft member.

3. A magnetic suspension system as defined in claim 2, further including a capacitor connected to each of said coils for tuning it to resonate at a frequency displaced from the frequency of said alternating current, thereby enhancing the change of voltage as a function of displacement of said shaft member.

4. A magnetic suspension system as defined in claim 3, said means for augmenting the control of said electromagnetic means comprising recitifier and capacitor means coupled to each of said coils for producing a variable unidirectional voltage for addition to the electric signals produced by said transverse motion responsive means.

5. A magnetic suspension system as defined in claim 1, wherein said means responsive to displacement of said shaft member from said predetermined axis comprise a set of capacitor stator plates adjacent said shaft member an appreciable distance from the middle thereof and a further set of capacitor stator plates adjacent said shaft member an appreciable distance in the opposite direction from the middle thereof, and means for applying alternating voltage to said capacitor stator plates to produce across the capacitance between each plate and said shaft member an alternating voltage of amplitude dependent on the capacitance value thereof.

6. A magnetic suspension system as defined in claim 5, said means for augmenting the control of said electromagnetic means comprising rectifier and capacitor means coupled to each of said capacitor stator plates for producing a variable unidirectional voltage for addition to the electric signals produced by said transverse motion responsive means, said system further including fixed inductors connected to said capacitors and tuning them to resonate at a frequency displaced from the frequency of said alternating voltage, thereby enhancing the change of amplitude of alternating voltage across the capacitors with the variation of shaft position, and the resultant change of said variable unidirectional voltage.

7. A magnetic suspension system as defined in claim 1, wherein said means for generating electric signals substantially corresponding in polarity and intensity to the direction and speed of transverse movement of said shaft comprises two pairs of permanent magnet variable-reluctance pickoffs oriented substantially perpendicular to each other and to said predetermined axis and cooperating with said shaft member an appreciable distance from the middle thereof, and two further pairs of permanent magnet variable-reluctance pickoffs oriented substantially perpendicular to each and to said perdetermined axis and cooperating with said shaft member an appreciable distance in the opposite direction from the middle thereof.

8. A magnetic suspension system comprising
a movable shaft member to be suspended in a desired stable position along a predetermined axis,
a frame for said suspension system,
first electromagnetic means fixed to said frame for exerting mutually opposed transverse forces on said shaft member at a substantial distance to one side of the middle thereof,
first rate signal generating means fixed to said frame for generating electric signals substantially corresponding in polarity and intensity to the direction and speed of transverse movement of said shaft member in the vicinity of said first electromagnetic means,
means for amplifying said signals and controlling said first electromagnetic means in response to variations in said signals, from said rate signal generating means,
second electromagnetic means fixed to said frame for exerting mutually opposed transverse forces on said shaft member at a subtsantial distance to the opposite side of the middle thereof,
second rate signal generating means fixed to said frame for generating electric signals substantially corresponding in polarity and intensity to the direction and speed of transverse movement of said shaft in the vicinity of said second electromagnetic means,
means for amplifying said signals generated by said second rate signal generating means and controlling said second electromagnetic means in response to variations in said last-named signals,
means for generating signals representing displacement of said shaft from said axis and introducing them into each of said amplifying and controlling means to urge shaft member into alignment with said axis, means for exerting lonitudinal control on said shaft member to urge it into a substantially fixed position along said axis, and means for exerting longitudinal control on said shaft member to hold it in a substantially fixed position along said axis.

9. A magnetic suspension system as defined in claim 8, wherein said means for exerting longitudinal control comprise permanent magnet means at the ends of said shaft member, and permanent magnet means adjacent thereto fixed to said frame, said last-named permanent magnet means being polarized for mutual repulsion with the adjacent permanent magnet means on said shaft member.

References Cited
UNITED STATES PATENTS

| | | | |
|---|---|---|---|
| 3,112,962 | 12/1963 | Lautzenhiser | 308—10 |
| 3,146,038 | 8/1964 | Lautzenhiser | 308—10 |
| 3,209,602 | 10/1965 | Biderman | 308—10 |
| 3,243,238 | 3/1966 | Lyman | 308—10 |
| 3,307,884 | 3/1967 | Dunlap | 308—10 |
| 3,098,679 | 7/1963 | De Boice | 308—10 |

MILTON O. HIRSHFIELD, *Primary Examiner.*

L. L. SMITH, *Assistant Examiner.*